F. O. BOSWELL.
LOCKING MECHANISM FOR AUTOMOBILES AND ATTACHMENTS THEREOF.
APPLICATION FILED JUNE 15, 1916.
1,232,648.
Patented July 10, 1917.
4 SHEETS—SHEET 1.
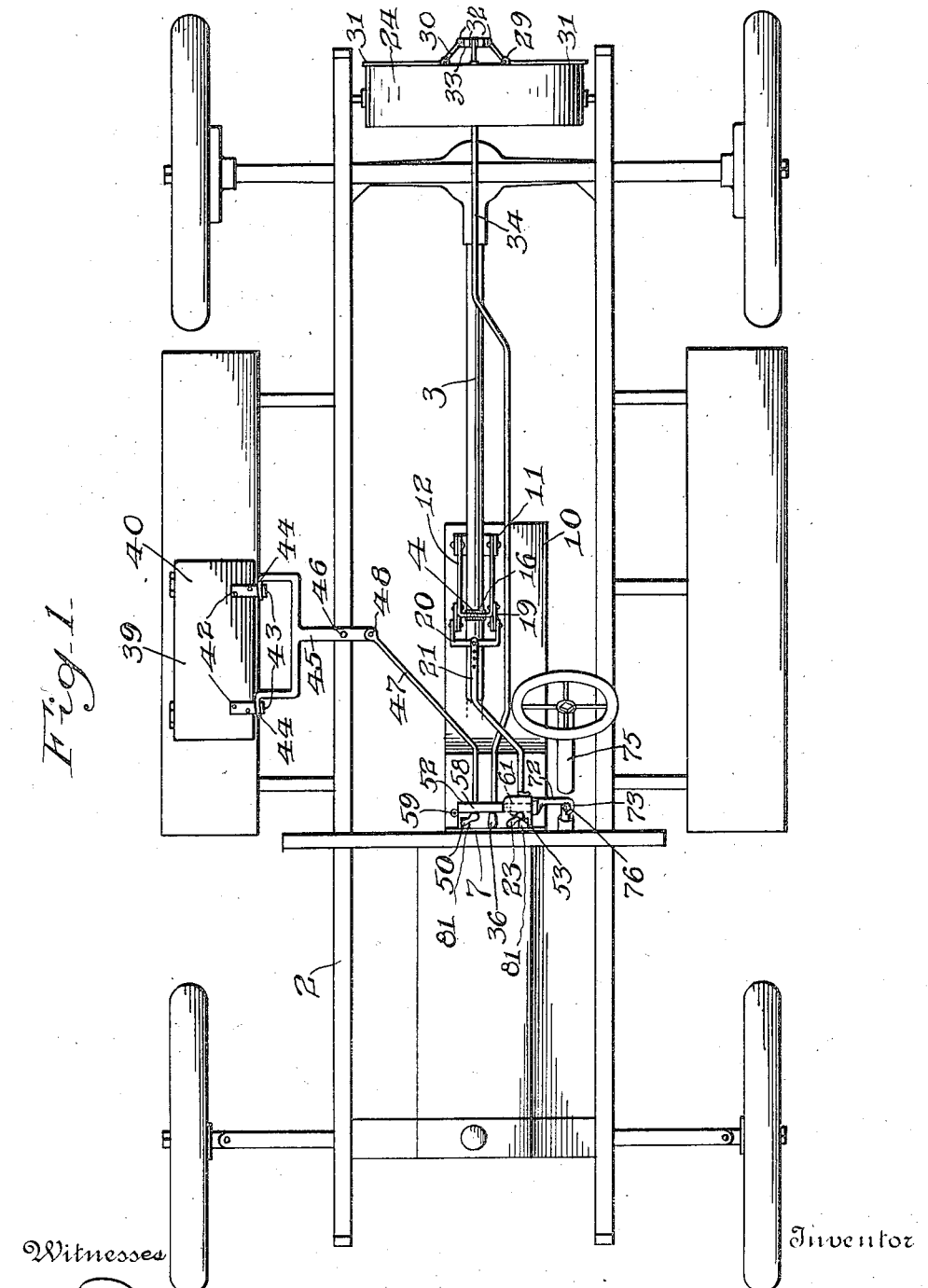

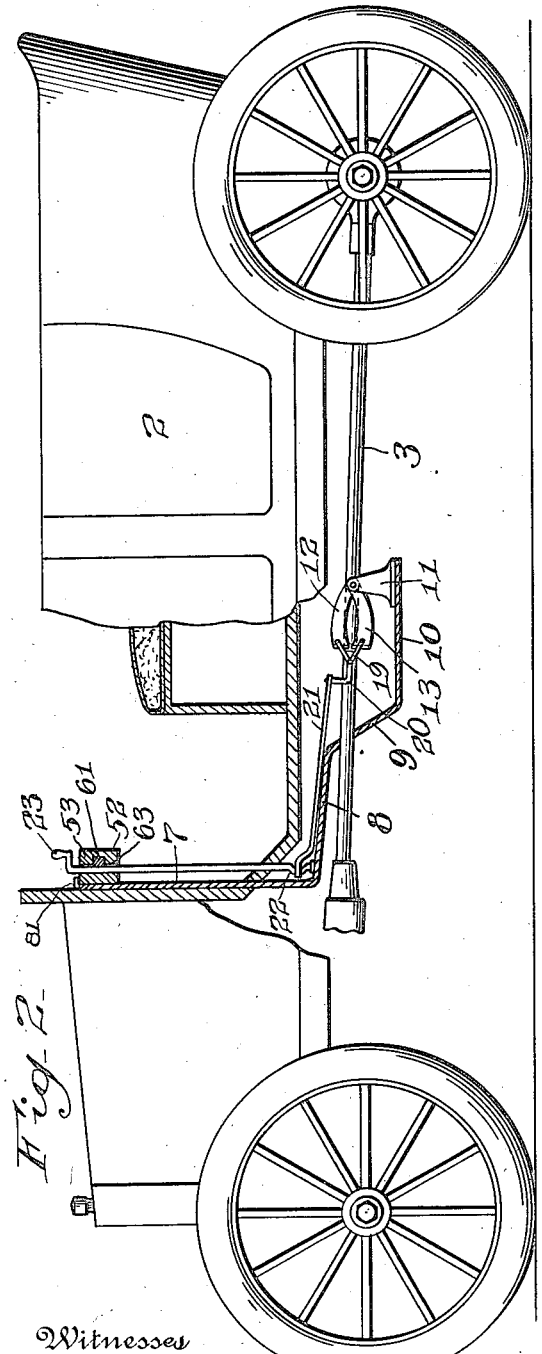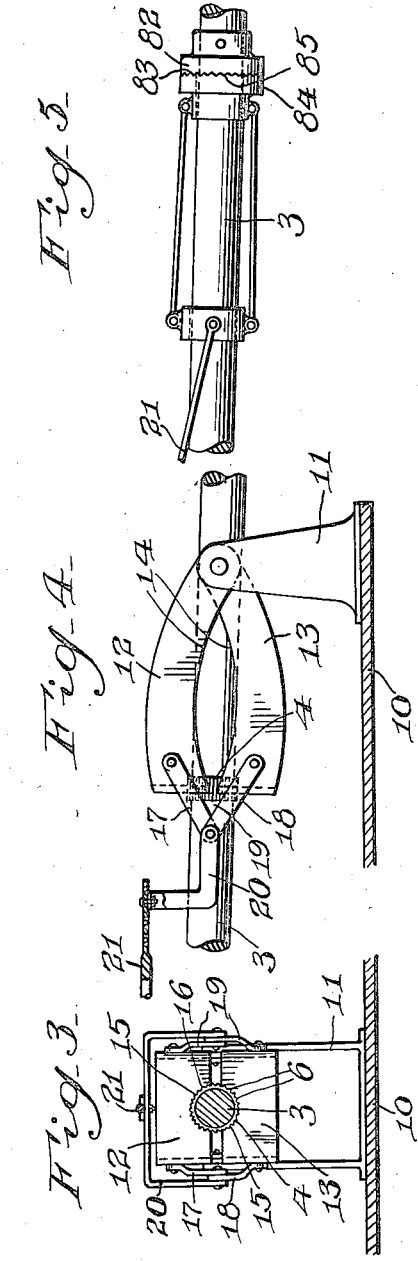

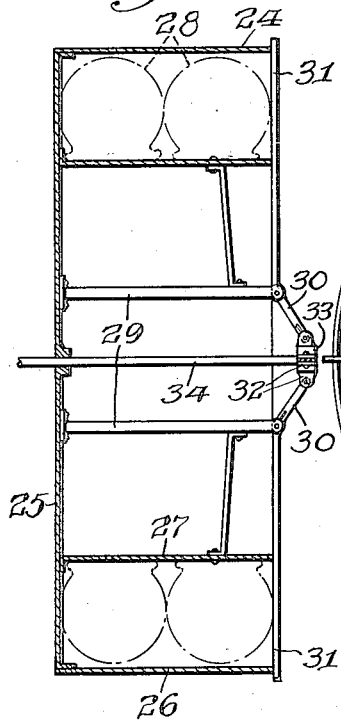
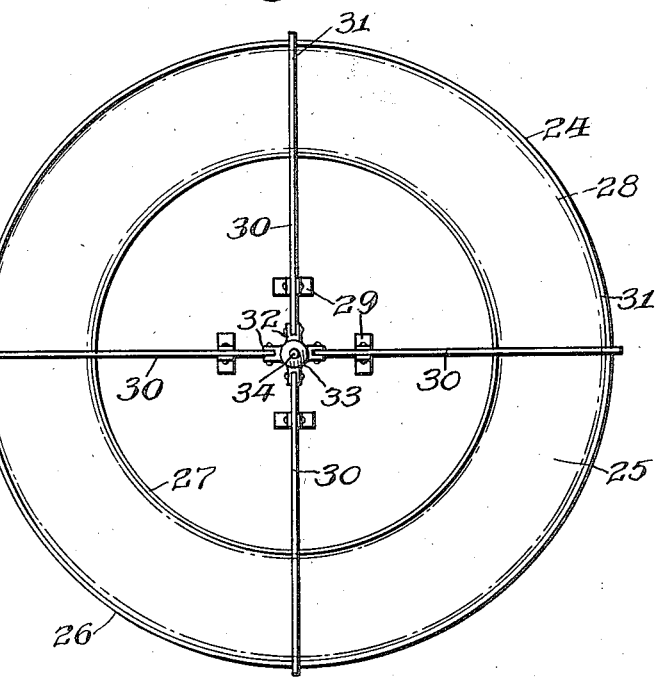
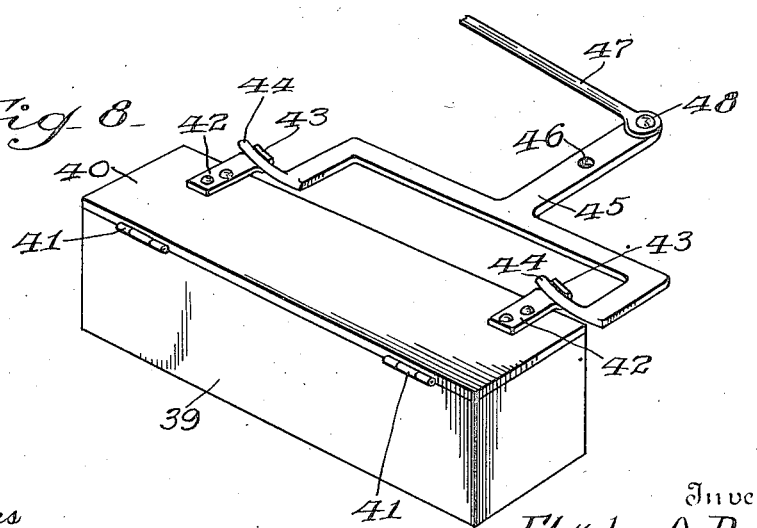

F. O. BOSWELL.
LOCKING MECHANISM FOR AUTOMOBILES AND ATTACHMENTS THEREOF.
APPLICATION FILED JUNE 15, 1916.
1,232,648.
Patented July 10, 1917.
4 SHEETS—SHEET 4.
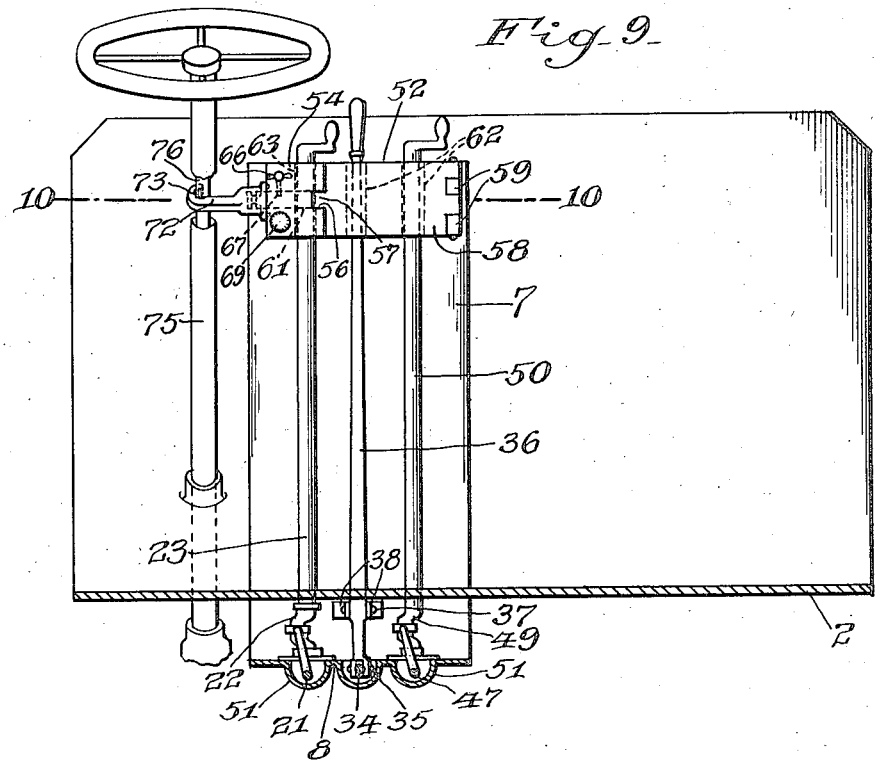
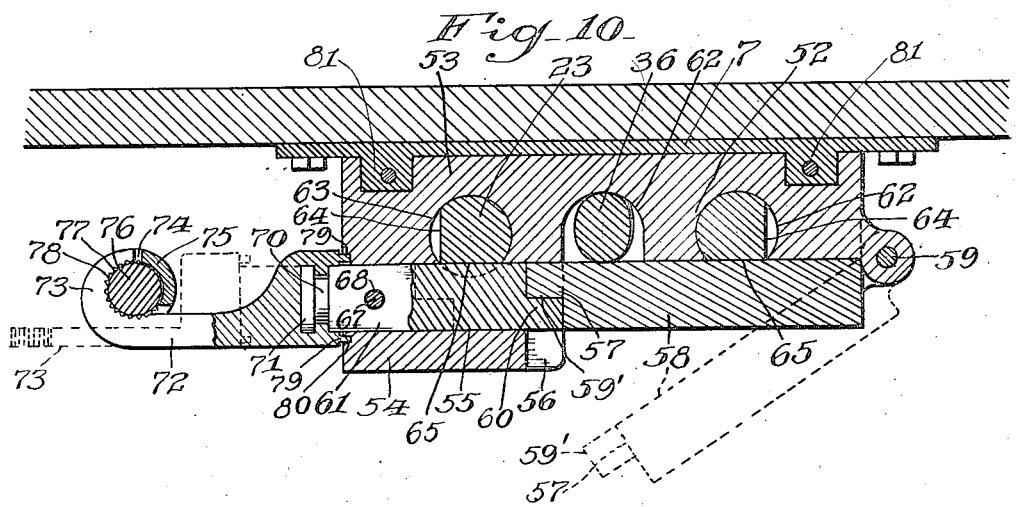
Witnesses
Inventor
Fletcher O. Boswell
Attorney

UNITED STATES PATENT OFFICE.

FLETCHER O. BOSWELL, OF PHILADELPHIA, PENNSYLVANIA, ASSIGNOR TO F. O. B. MANUFACTURING CO., OF PHILADELPHIA, PENNSYLVANIA, A CORPORATION OF DELAWARE.

LOCKING MECHANISM FOR AUTOMOBILES AND ATTACHMENTS THEREOF.

1,232,648. Specification of Letters Patent. Patented July 10, 1917.

Application filed June 15, 1916. Serial No. 103,759.

*To all whom it may concern:*

Be it known that I, FLETCHER O. BOSWELL, a citizen of the United States, residing at Philadelphia, in the county of Philadelphia and State of Pennsylvania, have invented new and useful Improvements in Locking Mechanism for Automobiles and Attachments Thereof, of which the following is a specification.

My invention relates to new and useful improvements in locking mechanism for automobiles and attachments thereof, and has for its object to provide an exceedingly simple and effective device of this character, whereby the car mechanism may be locked to prevent said car from being stolen or operated by an unauthorized person.

A further object of the invention is to provide a lever actuated mechanism for fastening or holding the driving shaft against rotation.

Another object of the invention is to provide a lever actuated means or device for preventing the withdrawal of tires from a tire trunk.

Another object of the invention is to provide a lever actuated means for holding the cover of a tool box in a closed position.

A still further object of the invention is to provide means for locking the different levers in that position which will hold the different fastening means in a closed position, and certain of said levers in that position which will hold the means connected therewith in an open position.

A further object of the invention is to provide a casing for holding the different levers or cranks, said casing having connected therewith a hinged locking member, and a sliding bolt coacting with said hinged locking member, said member and bolt being held and locked in a closed position by a suitable combination lock similar to those used on safes, the sliding bolt carrying means for engaging the steering post, whereby the latter may be held against rotation.

With these ends in view, this invention consists in the details of construction and combination of elements hereinafter set forth and then specifically designated by the claims.

In order that those skilled in the art to which this invention appertains, may know how to make and use the same, I will describe its construction in detail, referring by numerals to the accompanying drawings forming a part of this application in which—

Figure 1, is a plan view of a chassis of an automobile, showing my improved locking mechanism applied thereto.

Fig. 2, is a side elevation of an automobile, a portion thereof being broken away to clearly illustrate the application of my invention.

Fig. 3, is an enlarged end view of one form of locking means adapted to engage the driving shaft to prevent the rotation thereof, said driving shaft and the supporting plate being shown in section.

Fig. 4, is a side elevation thereof.

Fig. 5, is a similar view of a modified form of means for holding the driving shaft against rotation.

Fig. 6, is an enlarged vertical sectional view of a tire trunk, showing my locking mechanism applied thereto.

Fig. 7, is a face or rear end view thereof.

Fig. 8, is an enlarged perspective view of the tool box and the mechanism for locking the same.

Fig. 9, is an enlarged face view of the casing for locking the different levers and cranks, showing the same attached to the dash board of the automobile, and further illustrating the manner in which the steering post is held against rotation; and Fig. 10, is a section on the line 10—10 of Fig. 9, a portion of the sliding bolt being left in elevation.

In carrying out my invention as here embodied 2 represents an automobile of any desirable construction having a driving shaft 3 connected in the ordinary manner with the engine and running gear. The driving shaft 3 is provided with longitudinal corrugations formed in or upon the same, or upon a sleeve 4 immovably attached to said driving shaft, and having the longitudinal corrugations 6 formed on the outer circumference thereof.

On the inner face of the dash board of the automobile is mounted the metallic dash plate 7 having a horizontal portion 8 projecting rearwardly therefrom, beneath the floor of the automobile, said horizontal portion having a depending portion 9 projecting downwardly therefrom, said downwardly projecting portion having a lower horizontal portion 10 projecting rearwardly therefrom, the downwardly projecting portion 9 surrounding the driving shaft 3, and the lower horizontal portion 10 lying below the driving shaft. This lower horizontal portion 10 acts as a support for the pair of brackets 11, one of which is mounted on each side of the driving shaft, and to these brackets are pivoted the pair of oppositely disposed jaws 12 and 13 of the driving shaft holding or locking means. These jaws are each formed from a single piece of metal, bent approximately U shaped in longitudinal section, the adjacent edges of the arm portions being cut away as at 14, while the meeting edges of the bridge portion of the jaws has an arcuate notch 15 equal to approximately one half of the circumference of the driving shaft or the corrugated portion thereof, and the edge of this notch is corrugated or provided with serrations 16. To each of the jaws is pivoted a pair of levers 17 and 18, one lever of each pair being arranged on each side of the driving shaft 3, and the levers 17 are pivoted to the levers 18, so as to form a pair of toggle levers 19 arranged on opposite sides of the driving shaft.

To the central portions of the toggle levers are pivoted the ends of the yoke 20 which partially surrounds the driving shaft 3, and to this yoke is adjustably connected one end of the rod 21, the opposite end being journaled on the elbow 22 of the crank handle 23, the elbow 22 being detachably fastened to the crank handle, so that the parts may be readily mounted in position. By turning the crank handle 23 in one direction, the rod 21 will be forced rearwardly, which will straighten or expand the toggle levers 19, thereby opening the jaws 12 and 13 to disengage the serrations 16 from the corrugations 6 upon the driving shaft, at which time said driving shaft is free to revolve.

When it is desired to hold or lock the driving shaft 3 against rotation, the crank handle 23 is moved in the opposite direction, which will draw the rod 21 forward, thereby collapsing the toggle levers 19 and causing the jaws 12 and 13 to be drawn to the driving shaft until the serrations 16 mesh with the corrugations 6 upon said driving shaft, thus securely holding the driving shaft 3 against rotation.

It will be readily understood that when the driving shaft is held against rotation, the automobile cannot be operated under its own power.

In Figs. 1, 6 and 7, I have shown a tire trunk 24 generally mounted at the rear of the automobile. This tire trunk comprises an end wall 25, an inclosing wall 26 and a flange 27 within the inclosing wall, and spaced therefrom, whereby tires 28 may be placed therein as shown.

At different points upon the end wall are mounted brackets 29, which project outward about the same distance as the flange 27, and in these brackets are pivoted the arms 30. The outer ends of these arms each carry a leaf 31 which may be of any desirable width. For instance they may be relatively narrow as here shown, or they may be relatively wide, so as to cover a considerable portion of the circumference of the trunk, or they may be in the form of a segment equal to one quarter of the circumference of the trunk, so that when closed the contents of the trunk will be entirely covered. The opposite ends of the arms 30 are loosely pivoted to the projections or brackets 32 carried by the collar 33 mounted upon the rod 34 passing through the trunk, and the inclosing wall 25 thereof. The forward end of said rod 34 is pivoted to the lower end of the lever handle 36 which is pivoted as at 37 between the brackets 38 secured to the dash plate 7.

By drawing the upper or free end of the handle lever 36 outward or away from the dash-board, the opposite or lower end thereof will be moved inward or toward the dashboard, thereby moving the rod 34 forwardly, which will draw the inner ends of the arms 30 into the tire trunk, and this action will move the levers 31 outward into an open position, whereby the tires 28 may be drawn over the leaves and removed from the trunk.

By reversing the movement of the handle lever 36, the leaves 31 will be moved to the position shown in Figs. 6 and 7, so that said leaves will be disposed across the space between the outer wall 26 and the flange 27, thereby holding the tires in position, so as to prevent their accidental or unauthorized removal.

The reference numeral 39 denotes a tool box adapted to be secured to some suitable portion of the automobile, such as one of the steps, and this tool box is provided with a cover 40 hinged as at 41 to the upper edge of the outer side wall of the tool box. To the cover is secured suitable keepers 42, the outer ends of which project beyond the inner edge of the cover, and these keepers have eyes or hook portions 43 for the reception of the fingers 44 of the locking or holding member 45, said holding member being pivoted at 46 to some suitable portion of the automobile, and having an inwardly projecting portion, to which is pivoted a rod 47 as at 48. The opposite end of the rod 47 is attached to the elbow 49 of the crank handle 50. The rotation of the crank handle 50 causes the rod 47 to be moved backward and forward, thereby rotating the holding member 45 about its pivot point 46 to cause the fingers 44 to disengage or engage the keepers 42, and when said fingers are in engagement with said keepers, the tool box cover is securely held in a closed position.

The rods 21, 34 and 47 are all housed throughout a portion of their length in the channels 51 formed in the horizontal portion 8 of the dash plate.

To the dash plate 7 at or near the upper end thereof is secured the casing or locking housing 52 comprising a body 53 provided with an extension or enlargement 54 at one end thereof, said extension having a longitudinal bolt receiving opening 55 running entirely therethrough, and a transverse slot or groove 56 at one end thereof, with which registers the tongue 57 of the swinging locking member 58, the latter being hinged to the body as at 59, a portion of the free end of the swinging locking member 58 being cut away to form a lip 59' adapted to be engaged by a similar lip 60 formed upon the inner end of the sliding bolt 61, the latter being mounted in the longitudinal opening 55. In the smaller portion of the body 53 are formed a number of vertical notches 62, while in the portion of the body adjacent its extension is formed a vertical circular hole 63, a portion of which is in communication with the longitudinal opening 55.

The crank handle 23 is journaled in the vertical hole 63, and that portion of said crank handle situated in said hole is provided with two flat sides 64 and 65, so that when either flat side is turned toward the longitudinal opening 55 and the slide bolt 61 is inserted in the hole 55, said crank handle 53 will be locked in one of two positions. The crank handle 50 is also provided with two flat sides along the portion thereof situated in the notch 62, and when one of said flat sides is engaged by the swinging locking member 58, said crank handle will be locked against rotation.

The lever handle 36 is adapted to engage the other notch 62, and when in this position, the same is held against movement by the swinging locking member 58 when disposed across a notch.

When the parts have been adjusted to the positions desired the swinging locking member may be closed as shown in Fig. 10, and the sliding bolt 61 moved inward until the lip 60 thereof engages the lip 59 of the member 58, at which time the handle 66 of the combination lock may be turned to cause the locking bolt 67 to register with the keeper hole 68 in the sliding bolt 61, after which the knob 69 of the combination lock may be turned to throw the tumblers to prevent the withdrawal of the locking bolt 67 until the knob 69 is again manipulated with the proper combination to withdraw the lock tumblers.

The description of this combination lock is only general, as any well known combination lock, such as used upon safes may be used in conjunction with this device, the desire being to lock the parts so that only authorized persons may use the same, and so that the combination of the lock may be changed should an unauthorized person learn the combination being used.

The sliding bolt 61 is provided with a neck 70 and a head 71, whereby the steering post locking hook 72 may be swiveled to said sliding bolt. The outer end or curved tang 73 of the locking hook is adapted to pass into the slot 74 in the steering post housing 75, and engage the steering post 76, the latter being corrugated longitudinally as at 77 while the inner face of the tang 73 is provided with serrations 78 adapted to mesh with the corrugations on the steering post when the sliding bolt is entirely inserted in the hole 55, and when said sliding bolt is locked, the steering post cannot be turned for steering the automobile.

In order to prevent the locking hook 72 from turning, I provide the same with a number of projections 79 which will register with holes 80 in one face of the housing 52 when the sliding bolt is entirely within its opening. In order to unlock the steering post, so that the same may be used, the sliding bolt 61 is withdrawn the desired distance from the housing 52, which will disengage the projections 79 from the holes 80. Then the locking hook 72 may be rotated, so that the tang 73 thereof will be out of line with the steering post, after which the sliding bolt 61 may be again moved to its locking position, and the projection 79 will engage certain others of the holes 80, so that the locking hook 72 will not be turned by the jarring of the automobile.

In order that other attachments may be fastened to the dashplate 7, I provide the upper end thereof with inwardly projecting integral extensions 81, to which may be bolted a lamp, a signal or other attachment.

For convenience of illustration I have shown means for locking the steering post, the driving shaft and certain attachments of the automobile, but it will be readily understood that any number of crank or lever handles may be provided for locking other parts or attachments of the automobile. As for instance, a lever may be provided for opening and closing a valve in the supply pipe of the gasolene tank, whereby the same may be locked open or closed, and an additional lever could also be provided having a socket adapted to engage a similarly shaped end of the cam shaft of the engine.

When it is desired to run the automobile, the combination lock is manipulated, so as to unlock the sliding bolt 61, which is then partially withdrawn from its opening 55, the locking hook 72 turned down, and the crank handle 23 rotated in that direction which will cause the jaws 12 and 13 of the driving shaft holding device to be disengaged from the driving shaft. After these parts are disengaged, the sliding bolt is then returned to its horizontal position and locked, so as to lock the parts just mentioned in their open positions, thereby preventing them from being accidentally reëngaged, and when the automobile is not being used, the parts may be securely locked as hereinbefore described, and only the person authorized to use the automobile will be able to unlock the parts.

When it is desired to secure access to the attachments, such as the tire trunk or the tool box, the sliding bolt 61 is withdrawn and the swinging locking member 58 swung outward as shown by dotted lines in Fig. 10, at which time the crank handle 50 may be rotated to unlock the tool box, or the lever handle 36 may be withdrawn to open the tire trunk, but when the parts are locked, no one except the person knowing the combination of the combination lock will be able to remove any of the contents of the tire trunk or the tool box.

A locking mechanism constructed as herein described enables the owner of an automobile to be fairly sure that the machine or any of its attachments will not be disturbed during the time it is left alone, and where a chauffeur is employed, the owner can require the chauffeur to obtain a bond covering the value of the car and its equipment, and since no one but the owner and the chauffeur will know the combination of the combination lock, then the company holding the bond can be held responsible for any loss, and should the chauffeur leave the owner's employ, the combination of the lock can be changed, thus practically insuring the car or its equipment against theft at a very reasonable rate.

In Fig. 5, I have shown a slightly modified form of means for holding the driving shaft against rotation, in which a collar 82 having serrations 83 on one face thereof is securely attached to the driving shaft, while a coacting sliding collar 84 provided with serrations 85 upon its abutting face is loosely and slidably mounted upon the driving shaft, and this sliding collar is attached in any suitable manner to the rod 21. By turning the crank shaft 23 in one direction, the sliding collar 84 will be moved into engagement with the stationary collar 82, so that the serrations of said collars mesh with each other, which will securely lock the driving shaft against rotation, but by moving the crank handle 23 in the opposite direction, the sliding collar 84 will be moved along the driving shaft 3, so that its serrations will be disengaged from the serrations of the stationary collar 82, thereby unlocking the driving shaft 3, so that the same is free to revolve.

Of course I do not wish to be limited to the exact details of construction as herein shown, as these may be varied within the limits of the appended claims without departing from the spirit of my invention.

Having thus fully described my invention, what I claim as new and useful, is—

1. In a device of the character stated means for holding a driving shaft against rotation, operating means for actuating said first named means, means engaging the operating means for holding the same in certain positions, and a lock for locking said last named means.

2. In a device of the character stated means for holding a driving shaft against rotation, operating means for actuating said first named means, means engaging the operating means for holding the same in certain positions, and a combination lock for locking said last named means.

3. In a device of the character stated a holding means adapted to hold the driving shaft of a vehicle against rotation, a rod connected thereto, a crank handle connected with said rod for operating the holding device, means adapted to engage said crank handle for holding the same in different adjusted positions, and a combination lock for holding said last named means.

4. In combination with a vehicle having a driving shaft and attachments thereon, means for holding said shaft against rotation, means for holding parts of said attachments closed, rods attached to said means, handles connected to said rods for operating said means, and means for locking said handles.

5. In combination with a vehicle having a driving shaft and attachments thereon, means for holding said shaft against rotation, means for holding parts of said attachments closed, rods attached to said means, handles connected to said rods for operating said means, means carried by the vehicle for engaging said handles to hold the same in different adjusted positions, and a combination lock for locking said last named means.

6. In combination with a vehicle having a driving shaft and provided with a tire trunk and a tool box, means adapted to engage the driving shaft to prevent the rotation thereof, a rod connected thereto, means adapted to be disposed across the tire trunk for preventing the withdrawal of the contents thereof, a rod connected to said means, means for holding the cover of the tool chest in a closed position, a rod connected with said means, a plurality of handles to which said rods are connected whereby the different means may be actuated, and means for locking said handles in different adjusted positions.

7. In combination with a vehicle having a driving shaft and provided with a tire trunk and a tool box, means adapted to engage the driving shaft to prevent the rotation thereof, a rod connected thereto, means adapted to be disposed across the tire trunk for preventing the withdrawal of the contents thereof, a rod connected to said means, means for holding the cover of the tool chest in a closed position, a rod connected with said means, a plurality of handles to which said rods are connected whereby the different means may be actuated, means for holding said handles in different adjusted positions, and a combination lock for holding said last named means.

8. In a device of the character stated a tire trunk having a tire compartment, brackets carried by said trunk, arms pivoted in said brackets, leaves carried by said arms and adapted to project across the tire compartment, a rod passing through the tire trunk to which said arms are pivoted, a handle lever to which is pivoted the opposite end of the rod, whereby the leaves may be actuated by the operations of the lever handle, and means for locking said lever handle.

9. In a device of the character stated a tire trunk having a tire compartment, brackets carried by said trunk, arms pivoted in said brackets, leaves carried by said arms and adapted to project across the tire compartment, a rod passing through the tire trunk to which said arms are pivoted, a handle lever to which is pivoted the opposite end of the rod, whereby the leaves may be actuated by the operations of the lever handle, means adapted to engage the lever handle, whereby the same may be held in that position which will hold the leaves disposed across the tire compartment, and a combination lock for locking said leaves.

10. In a device of the character stated a tool box having a hinged cover, keepers projecting from the free edge of the tool box cover, a pivot holding device adapted to engage said keepers for holding the cover in a closed position, a handle for operating said holding device, means for holding said handle in a closed position, and a combination lock for locking said means.

11. A locking mechanism for automobiles and attachments thereof comprising a plurality of holding devices, a pivot lever handle for operating one of said holding devices, crank handles for actuating said other holding devices, said crank handles having two flat sides at right angles to each other, a casing provided with an opening in which is rotatably mounted one of the crank handles, said casing also having slots for receiving the other operating handles, a swinging locking member hinged to the casing for locking certain of said operating handles, a bolt slidably mounted in the casing for locking the other operating handle and for engaging the swinging locking member for holding it in its closed position, and a combination lock mounted within the casing for locking the sliding bolt.

12. A locking mechanism for automobiles and attachments thereof comprising a plurality of holding devices, a pivot lever handle for operating one of said holding devices, crank handles for actuating said other holding devices, said crank handles having two flat sides at right angles to each other, a casing provided with an opening in which is rotatably mounted one of the crank handles, said casing also having slots for receiving the other operating handles, a swinging locking member hinged to the casing for locking certain of said operating handles, a bolt slidably mounted in the casing for locking the other operating handle and for engaging the swinging locking member for holding it in its closed position, a steering post locking member swiveled to the sliding bolt, and a combination lock carried by the casing adapted to lock the sliding bolt.

In testimony whereof, I have hereunto affixed my signature.

FLETCHER O. BOSWELL.